April 19, 1938.   A. L. BERGER   2,114,285
DIFFUSER FOR CENTRIFUGAL COMPRESSORS
Filed Nov. 28, 1936
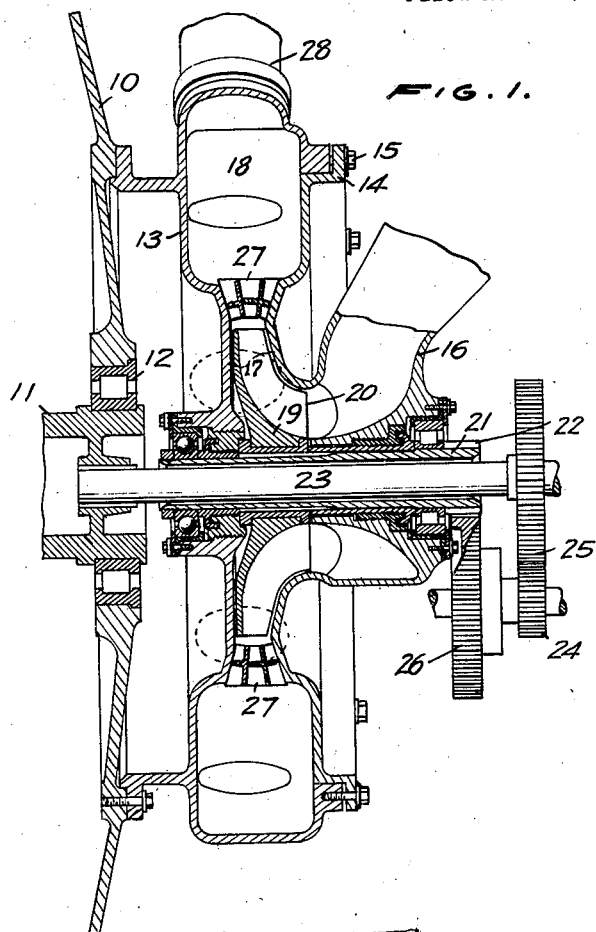
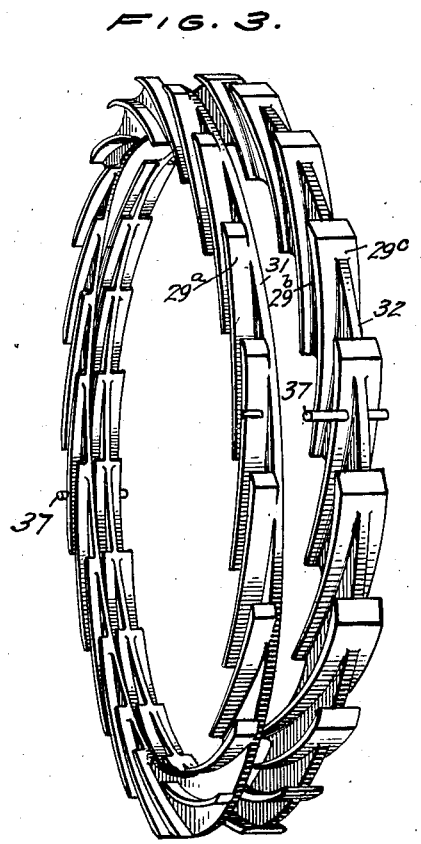
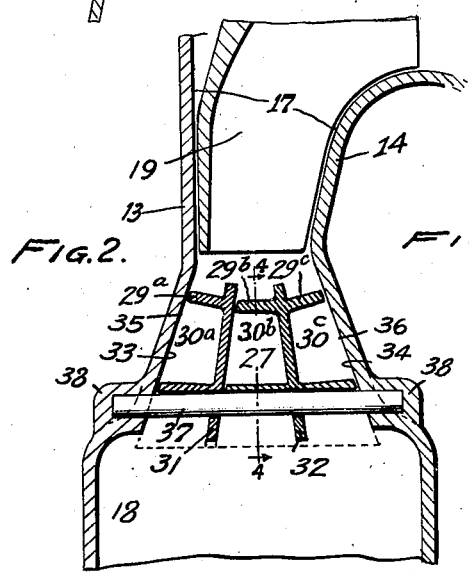
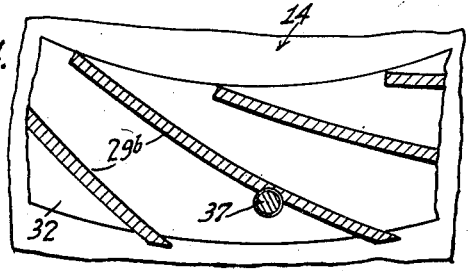
INVENTOR
ADOLPH L. BERGER Patented Apr. 19, 1938

2,114,285

UNITED STATES PATENT OFFICE 2,114,285

DIFFUSER FOR CENTRIFUGAL COMPRESSORS

Adolph L. Berger, Dayton, Ohio

Application November 28, 1936, Serial No. 113,237

6 Claims. (Cl. 230—127)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to superchargers for internal combustion engines, more specifically to the centrifugal type of compressors or superchargers which include an impeller rotatably disposed in an impeller chamber for forcing air radially outward into a scroll or collecting passage. These compressors also include a diffuser concentrically spaced about the impeller for converting velocity energy imparted to a fluid, such as air, into pressure energy.

Where superchargers are provided in connection with aircraft, engine weight must be reduced to a minimum. It is therefore an object of my invention to materially reduce the outer diffuser diameter without corresponding reduction in diffuser efficiency. Particularly is this true with respect to the scroll or collecting chamber which in an aircraft arrangement is connected at different points to the cylinders of an internal combustion engine. In the case of a nine-cylinder engine the outer portion of the collector passage is connected to nine conduits, preferably uniformly spaced along the circumference of the collector passage for conducting air or a mixture of air and fuel to the cylinders of the combustion engine. In the case of a four-cycle nine-cylinder radial engine, ignition in the different cylinders occurs in the order of 1, 3, 5, 7, 9—2, 4, 6, 8, cylinder #1 being usually located on the top vertical center. A complete cycle in such engine takes place during two complete revolutions or 720 angular degrees rotation of the engine crank shaft. The supercharger for furnishing air to the different cylinders must be designed to deliver fluid at a uniform rate and furnish an equal amount of air or mixture of air and fuel to each cylinder. The actual discharge of fluid, however, occurs intermittently at a very rapid rate, the point of discharge traveling around the collector passage in the direction of the firing order of the cylinders in order to supply the intake valves as they open in turn.

Usually the air-intake valve of each cylinder is open for approximately 220 angular degrees of a revolution, during which period all of the air used must enter the cylinder. It is important to note that since the duration of valve opening is greater than the interval between successive valve openings, simultaneous supply of air takes place to at least two and frequently three alternately adjacent valves for a certain period of the total valve opening time. Thus, while the intake valve to cylinder #1, in the above example is wide open, the intake valve to cylinder #8 is closing and the intake valve to cylinder #3 is starting to open. For this reason cylinder #3 is deprived by cylinders #1 and #8 of much of its air supply obtained from the normal flow of the air in the collector passage. Now, due to this fact, as outlined below, the direction of flow of air through the collector passage or chamber of the supercharger is intermittently changed with respect to the different cylinders.

Assuming the normal air flow through the collector passage takes place in clockwise direction, and also assuming a condition during which the air-intake valve for cylinder #8 is closing and the air-intake valve for cylinder #1 is open, then the air flowing to the connections with cylinders #8 and #1 along the path defined within the collector passage is substantially entirely discharged through said connections. Now, when the air-intake valve for cylinder #3 opens, its normal supply of air is already being taken by cylinders #8 and #1. Therefore any air obtained by cylinder #3 during the early part of the stroke must come from that section of the collector passage lying beyond cylinder #3 in the direction of rotation. This can only be accomplished by causing a complete reversal of the direction of flow of air beyond cylinder #3.

It should be noted in connection with superchargers used with aircraft, the collector passages and scrolls are of small dimension, resulting in high velocity of the air flowing therethrough and rapid reversal of flow. In other words, the air discharged from an aircraft supercharger is not as uniform and uni-directional as is the case in the conventional type of compressor. The air discharge in an aircraft supercharger is intermittent, taking place at different points along the circumference of the air collector and accompanied by sudden reversals of the direction of flow at least along a part of the collector.

It is therefore a particular object of my invention to provide an improved multiple diffuser for superchargers whereby the aforementioned drawbacks in connection with air craft internal combustion engines are greatly reduced with corresponding weight reduction in the standard type of diffuser heretofore utilized.

It is likewise an object of my invention to provied an improvement in compressor diffusers of the character described, whereby not only uniformity of air flow, but also marked reduction in over-all diameter of the scroll directing flow to the cylinders of a supercharged aircraft engine is obtained.

With the foregoing and other objects in view, which will appear as the description proceeds, the invention consists of certain new and novel improvements in multiple diffusers, which will be hereinafter more fully illustrated and described in the accompanying drawing and more particularly pointed out in the appended claims.

Referring to the drawing, in which numerals of like character designate similar parts throughout the several claims:

Fig. 1 is a sectional view of built-in supercharger in connection with an aircraft internal combustion engine;

Fig. 2 is an enlarged sectional view of the lower scroll portion of Fig. 1;

Fig. 3 is a perspective view of the diffuser core shown in Figs. 1 and 2; and

Fig. 4 is a sectional view taken on the lines 4—4 of Fig. 2.

The arrangement in Figs. 1 and 2 comprises an internal combustion engine having a casing 10 and a crank shaft 11 supported by an anti-friction bearing 12 on the casing 10. Other parts, such as cylinders, valves, etc., of the internal combustion engine 10 are not shown because they may be of conventional design and they do not form a part of my invention. A centrifugal compressor for supercharging the engine is secured to the engine and driven by the crank shaft thereof. This compressor or supercharger has a casing comprising two halves 13 and 14 fastened together by bolts 15. The two casing halves define an inlet conduit 16 for conducting a medium, such as air, to an impeller chamber 17, from thence through a diffuser chamber (defined by the walls 35 and 36 of Fig. 2), and then to a collector passage or scroll 18. An impeller 19 having a plurality of blades 20 is disposed in the impeller chamber and rotatably secured to and driven by a quill shaft 21. The quill shaft 21 carries a pinion 22 on its right-hand end which is driven from the crank shaft 11 through a shaft 23 projecting through the bore of the quill shaft and a gearing 24 including a gear 25 secured to the shaft 23, and a gear 26 meshing with the pinion 22.

A multiple diffuser core 27 is interposed between the two cooperating and surrounding walls of the diffuser chamber for converting the velocity energy imparted to the air or like medium by the rotating impeller into pressure energy. Thus, during operation, air or like medium is drawn through the inlet conduit 16 and by the action of the rotating impeller 19 the air is discharged at high velocity from the periphery of the impeller. The velocity energy then is converted into pressure energy by the multiple diffuser core 27, and surrounding chamber side walls. The compressed air or like medium contained in the collector passage or scroll 18 is discharged therefrom and conducted to the different cylinders of the combustion engine to be supercharged by a plurality of conduits 28 connected to the outer part of the collector passage 18 at points substantially uniformly spaced around the periphery of the collector.

The collector passage 18 is made comparatively small to keep the length of the engine, and consequently its weight down as much as possible. The discharge from the collector passage to the cylinders is non-uniform, the velocity of the air through the passage is relatively high and the direction of flow of air or like medium is not uni-directional but is suddenly and progressively reversed during short time intervals. In order to overcome the drawback of these conditions, and to facilitate the necessary reversals of flow and to secure an equal supply to each cylinder, I provide in accordance with my invention the special multiple diffuser core 27.

The diffuser core, as shown in Figs. 2, 3 and 4, comprises a plurality of vanes or blades 29a, 29b, and 29c, shaped and arranged to form when enclosed in the two casing halves 13 and 14, a plurality of like expanding passages 30a, 30b, and 30c, uniformly spaced about a common axis for converting velocity energy of a medium flowing therethrough into pressure energy. The aforesaid passages should not be less than two in number, a construction requiring but one centrally disposed supporting wall. The vanes 29a are cast integral with a side wall 31, while the vanes 29b and 29c are cast integral with a centrally disposed wall 32. The vanes 29a and 29c have outer edges 33 and 34, respectively, which are circular in shape and engage side walls 35 and 36, respectively, formed on the corresponding casing halves 13 and 14. The multiple diffuser core 27 is held in proper position with reference to side walls 35 and 36 by means of two pins 37 anchored within pin bosses 38.

From an inspection of Figs. 2, 3 and 4, it is at once apparent that from inlet to outlet the passages 30a, 30b and 30c expand not only in direct proportion to outer diffuser diameter increase over inner, as measured circumferentially, but also in side elevation as measured parallel to the impeller shaft 23. It, therefore, follows that the outside diameter of my improved diffuser can be materially reduced over a similar diameter of a diffuser provided with walls entirely normal to the shaft of its impeller or with walls duplicating the lateral slope of any one of the passages 30a, 30b or 30c and having an outlet area identical to the outlet area of my improved diffuser. Thus, material outside diameter decrease in the side walls 31 and 32, with corresponding decrease in the over-all length of the arcuate vanes 29a, 29b, and 29c, will affect material reduction in diffuser weight. Another important improvement is accomplished by the above. Fluid flowing from the impeller 19 through the diffuser core 27 and into the scroll or collecting chamber 18 is discharged not only circumferentially from the diffuser but also laterally in both directions to the collecting passage. This provides additional paths for the reversals in flow described above, results in more uniform charge of the different engine cylinders connected to the collecting passage and less loss in pressure due to the reversals. In Fig. 2, the cross-sectional view through the diffuser core 27 has been taken slightly ahead of the mid-portion of any one set of adjacent blades 29a, 29b, and 29c, in advance of the leading edges of the next following set of blades and to the rear of the trailing edges of the immediately preceding set of blades such that but a single lateral cross-section is involved.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent is:

1. A centrifugal type supercharger for combustion engines comprising a casing defining an impeller-diffuser chamber with an inlet conduit connected with the impeller chamber portion thereof and a collector passage surrounding the diffuser chamber portion thereof, said collector passage having outlet openings for discharging a compressed medium to a plurality of engine cylinders, an impeller rotatably disposed within said impeller chamber portion for forcing air radially outward, and a core for forming in conjunction with the two defining walls of said diffuser chamber portion a multiple diffuser for converting velocity energy of a medium impelled by the impeller into pressure energy, said multiple diffuser core including a plurality of vanes and one or more walls for supporting the same, said wall or walls being so constructed with respect to the two defining walls of the diffuser chamber portion as to effect medium discharge from each passageway defined by any two adjacent vanes and side wall portions therebetween in a lateral direction as well as circumferentially outward.

2. A centrifugal type supercharger for internal combustion engines comprising an impeller-diffuser chamber with an impeller rotatably disposed within the impeller chamber portion thereof, a core for forming in conjunction with the two defining walls of the diffuser chamber portion a multiple diffuser for receiving a medium discharged from said impeller chamber portion and converting its velocity energy into pressure energy, and a collector passage for receiving compressed medium discharged from said multiple diffuser, an outer part of the diffuser core being disposed in the midst of said collector passage, the diffuser core comprising a plurality of vanes and one or more walls secured thereto, said wall or walls being constructed with respect to the two defining walls of the diffuser chamber portion to permit lateral as well as circumferential discharge of compressed medium from each passageway defined by any two adjacent vanes and side wall portions therebetween.

3. A centrifugal type supercharger for combustion engines comprising a casing, an impeller-diffuser chamber having walls formed by said casing, an impeller rotatably disposed within the impeller chamber portion thereof, a collector passage surrounding said impeller chamber portion for receiving fluid discharged therefrom and conducting it to different cylinders of a combustion engine, and a core for forming in conjunction with the two defining walls of the diffuser chamber portion a multiple diffuser, said core being disposed at least partly within the collector passage for receiving medium forced radially outward by the impeller action and converting velocity energy of such medium into pressure energy, said diffuser core having a wall or walls and a plurality of vanes the outermost of which have their free edges contacting said diffuser chamber side walls whereby the latter forms side walls for the diffuser core, said casing and diffuser core wall or walls being constructed and arranged to permit lateral as well as circumferential discharge of compressed medium from each passageway defined by any two adjacent vanes and side wall portions therebetween.

4. A centrifugal type supercharger for combustion engines comprising a casing, an impeller-diffuser chamber having walls formed by said casing, an impeller rotatably disposed within the impeller chamber portion thereof, a collector passage surrounding said impeller chamber portion for receiving fluid discharged therefrom and conducting it to different engine cylinders, a core for forming in conjunction with the two defining walls of the diffuser chamber portion a multiple diffuser, said core being disposed at least partly within the collector passage for receiving medium forced outward by the impeller action and converting velocity energy of such medium into pressure energy, said multiple diffuser core having a wall or walls and a plurality of vanes with edges secured to said wall or walls, the free edges of said vanes being close to said casing walls whereby the latter forms side walls for said diffuser core, said casing and diffuser core wall or walls being constructed and arranged to permit lateral as well as circumferential discharge of compressed medium from each passageway defined by any two adjacent vanes and side wall portions therebetween.

5. An article of manufacture for use in a centrifugal type compressor as a multiple diffuser core for converting, when used in conjunction with the compressor side wall defining the diffuser chamber, velocity energy of a medium into pressure energy, such article comprising a plurality of vanes centrally disposed about a common axis and a wall or walls secured to the vanes to define a plurality of passages, said wall or walls being constructed and arranged to permit lateral as well as circumferential discharge of compressed medium from each passageway defined by any two adjacent vanes and side wall portions therebetween.

6. An article of manufacture for use in a centrifugal type compressor as a multiple diffuser core for converting, when used in conjunction with the compressor side wall defining the diffuser chamber, velocity energy of a medium into pressure energy, said article comprising a plurality of arcuate vanes with outer edges increasingly spaced toward maximum diffuser diameter for defining a plurality of nozzle passages and a wall or walls secured to the vanes such that said arcuate vanes are divided into predetermined and like outwardly tapering passageways to effect discharge of a medium from the multiple diffuser in a lateral direction as well as circumferentially outward.

ADOLPH L. BERGER.